(12) United States Patent
Militaru et al.

(10) Patent No.: US 7,016,579 B2
(45) Date of Patent: Mar. 21, 2006

(54) OPTICAL FIBER CABLE WITH INTERSTITIAL SUPPORT MEMBERS

(75) Inventors: Cristian Militaru, Greer, SC (US); Lawrence E. Davis, Greenville, SC (US)

(73) Assignee: Alcoa Fujikura Limited, Franklin, TN (US)

( * ) Notice: Subject to any disclaimer, the term of this patent is extended or adjusted under 35 U.S.C. 154(b) by 507 days.

(21) Appl. No.: 10/093,212

(22) Filed: Mar. 7, 2002
(Under 37 CFR 1.47)

(65) Prior Publication Data

US 2002/0150360 A1     Oct. 17, 2002

Related U.S. Application Data

(63) Continuation-in-part of application No. 10/052,807, filed on Jan. 23, 2002.

(60) Provisional application No. 60/264,549, filed on Jan. 26, 2001.

(51) Int. Cl.
G02B 6/44 (2006.01)

(52) U.S. Cl. .................. 385/111; 385/112; 385/114

(58) Field of Classification Search ......... 385/100–114
See application file for complete search history.

(56) References Cited

U.S. PATENT DOCUMENTS

| | | | |
|---|---|---|---|
| 4,852,964 A | 8/1989 | Holland et al. ........... | 350/96.23 |
| 5,189,721 A | 2/1993 | Sayegh et al. ............. | 385/114 |
| 5,408,562 A | 4/1995 | Yoshizawa et al. ........ | 385/112 |
| 5,621,841 A | 4/1997 | Field ........................... | 385/113 |
| 5,630,003 A * | 5/1997 | Arroyo ....................... | 385/113 |
| 5,751,880 A * | 5/1998 | Gaillard ...................... | 385/109 |
| 5,761,361 A * | 6/1998 | Pfandl et al. ............... | 385/100 |
| 6,088,499 A | 7/2000 | Newton et al. ............. | 385/112 |
| 6,185,351 B1 | 2/2001 | Daneshvar et al. ........ | 385/114 |
| 6,205,276 B1 * | 3/2001 | Anelli et al. ................ | 385/100 |
| 6,249,629 B1 * | 6/2001 | Bringuier .................... | 385/113 |
| 6,292,611 B1 * | 9/2001 | Chamberlain et al. ..... | 385/114 |
| 6,577,796 B1 * | 6/2003 | Anelli et al. ................ | 385/112 |
| 6,621,966 B1 * | 9/2003 | Lail ............................. | 385/114 |

FOREIGN PATENT DOCUMENTS

| CA | 2265176 | 9/1999 |
|---|---|---|
| EP | 0 503 469 | 9/1992 |
| WO | WO 02/079846 | 10/2002 |

* cited by examiner

Primary Examiner—Gregory J. Toatley, Jr.
Assistant Examiner—Sang H. Nguyen
(74) Attorney, Agent, or Firm—Tracey D. Beiriger; Eckert Seamans Cherin & Mellott, LLC

(57) ABSTRACT

Fiber optic conduits are received around a central axis with their axes extending in the same direction as the central axis and with each fiber optic conduit tangent to two other fiber optic conduits. The fiber optic conduits define a first interstitial space therebetween and a plurality of second interstitial spaces between each pair of fiber optic conduits on a side thereof opposite the first interstitial space. An interstitial member is received tangent to each pair of fiber optic conduits defining each second interstitial space. Grounding members surround the interstitial members and the fiber optic conduits with their longitudinal axes extending in the same direction as the central axis. Each grounding member is tangent to two other grounding members and an imaginary tube which surrounds and is tangent to the interstitial members and the fiber optic conduits and which has a longitudinal axis coaxial with the central axis.

16 Claims, 3 Drawing Sheets

OPTICAL FIBER CABLE WITH INTERSTITIAL SUPPORT MEMBERS

CROSS REFERENCE TO RELATED APPLICATIONS

This application is a continuation-in-part of U.S. patent application Ser. No. 10/052,807, filed Jan. 23, 2002, entitled "Optical Fiber Cable" which claims priority from United States Provisional Patent Application Ser. No. 60/264,549, filed Jan. 26, 2001, entitled "Optical Fiber Cable".

BACKGROUND OF THE INVENTION

1. Field of the Invention

The present invention relates to optical fiber cables and, more particularly, to an improved geometric arrangement of elements forming an optical fiber cable that decreases the diameter, linear weight and cost of the optical fiber cable while, at the same time, improving its mechanical performance.

2. Description of Related Art

With reference to FIG. 1, a prior art optical fiber cable assembly 2 includes a plurality of fiber optic tubes 4 and a plurality of adjacent wires 6 which provide some support to the cable design. A plurality of grounding members 8 surround tubes 4 and wires 6. When viewed from an end of optical fiber cable assembly 2, tubes 4 and wires 6 are received within an imaginary tube 10 which extends along the length of fiber optic cable assembly 2. Preferably, one wire 6 is positioned centrally within imaginary tube 10. This centrally positioned wire 6 is surrounded by tubes 4 and, if desired, other wires 6. The positions of tubes 4 and wires 6 around the centrally positioned wire 6 are determined based on the number of optical fibers 12 comprising optical fiber cable assembly 2. In the illustrated embodiment, a few optical fibers 12 are shown received within one of tubes 4. Preferably, however, each tube 4 is substantially filled with optical fibers 12.

In an exemplary embodiment of optical fiber cable assembly 2, tubes 4 and wires 6 surrounding the centrally positioned wire 6 have the same diameter and central wire 6 typically has a slightly larger diameter. The diameters of the various wires 6 and tubes 4 are selected so that each wire 6 and each tube 4 is tangent to any adjacent tubes 4 and/or wires 6. Similarly, each ground member 8 has a diameter that is selected so that each ground member 8 is tangent to its adjacent ground members 8. In practice, however, due to minor manufacturing variations in the diameters of grounding members 8, wires 6 and/or tubes 4, one or more grounding members 8 may not be tangent with their adjacent grounding members 8, and tubes 4 and wires 6 may not be tangent with their adjacent tubes 4 and/or wires 6.

Preferably, along the length of optical fiber cable assembly 2, tubes 4 and wires 6 are spiral wound in a first direction and grounding members 8 are spiral wound in a second direction, opposite the first direction. Subject to minor manufacturing variations, grounding members 8 are essentially tangent to an imaginary tube 10, which surrounds tubes 4 and wires 6 and which extends along the length of optical fiber cable assembly 2, and an imaginary tube 14, which surrounds grounding members 8 and which extends along the length of optical fiber cable assembly 2.

One problem with designs of optical fiber cable assemblies, like optical fiber cable assembly 2, is that the selection of wires 6 having the same, or nearly the same, outside diameter as tubes 4 increases the diameter and linear weight of optical fiber cable assembly 2. In addition, the number of tubes 4 comprising optical fiber cable assembly 2 will determine the number of wires 6 that can be utilized while maintaining the same geometric arrangement shown in FIG. 1. For example, in the geometric arrangement of optical fiber cable assembly 2 shown in FIG. 1, the sum of tubes 4 and wires 6 equals seven. Hence, the possible combination of tubes/wires is 1/6, 2/5, 3/4, 4/3, 5/2 and 6/1. As can be seen, the number of wires 6 decreases as the number of tubes 4 increases, and vice versa. Optical fiber cable assembly 2 is designed for aerial installation between utility poles or towers. As a result, in addition to supporting its own weight (self loading), optical fiber cable assembly 2 must also be designed to withstand weather related mechanical loads, such as wind loads, ice loads and snow loads, as well as electrical loads, such as short-circuits and lightning charges. Hence, decreasing the number of wires 6 while simultaneously increasing the number of tubes 4 is contrary to the need to increase the capacity of optical fiber cable assembly 2 to withstand weather related mechanical loads and electrical loads by increasing the number of wires 6 when the number of tubes 4 increases.

In addition, because of the geometric arrangement of tubes 4, wires 6 and grounding members 8 shown in FIG. 1, optical fiber cable assembly 2 has an outside diameter defined by imaginary tube 14. As would be appreciated by one of ordinary skill in the art, the diameter of imaginary tube 14 affects the possible weather related mechanical loads that could be experienced by optical fiber cable assembly 2 and related support structures. Namely, increasing the outside diameter of imaginary tube 14 increases the possible weather related mechanical loads that could be experienced by optical fiber cable assembly 2 and related support structures. In contrast, decreasing the outside diameter of imaginary tube 14 decreases the possible weather related mechanical loads that could be experienced by optical fiber cable assembly 2 and related support structures. Accordingly, in the design of optical fiber cable assemblies it is desirable to minimize the outside diameter while simultaneously maintaining or increasing the number of tubes 4 while, at the same time, providing a sufficient number of wires 6 of sufficient capacity to withstand expected self loading, possible weather related mechanical loads and electrical loads thereon when optical fiber cable assembly 2 is being installed and is in use. However, the geometric arrangement of tubes 4, wires 6 and grounding members 8 forming current optical fiber cable assemblies does not provide such an optimum design.

It is, therefore, an object of the present invention to overcome the above problems and others by providing a new optical fiber cable assembly that has an improved geometric design with improved mechanical and electrical performance over the prior art fiber optic cable assemblies. This improved geometric design enables the same number of optical fibers to be received in a smaller diameter than a prior art optical fiber cable assembly. In addition, the improved geometric design of the new fiber optic cable assembly enables the use of smaller diameter wires and grounding members while maintaining an amount of self loading, weather loading and electrical loading capacity that is commensurate with the smaller outside diameter and lower linear weight of the new fiber optic cable assembly. Still other objects will become apparent to those of ordinary skill in the art upon reading and understanding the following detailed description.

SUMMARY OF THE INVENTION

Accordingly, I have invented an optical cable assembly that includes a plurality of elongated cylindrical fiber optic tubes arranged with their axes extending in the same direction. The axis of each fiber optic tube is positioned at a corner of (i) an imaginary triangle (ii) or an imaginary square. The plurality of fiber optic tubes are arranged with each fiber optic tube tangent to two other fiber optic tubes and a first imaginary tube which surrounds the fiber optic tubes and which has an imaginary axis which extends in the same direction as the axes of the fiber optic tubes. Each pair of adjacent fiber optic tubes and the first imaginary tube define therebetween an interstitial space. The optical fiber cable assembly further includes a plurality of elongated cylindrical interstitial members. Each interstitial member is received in one of the interstitial spaces tangent to the two fiber optic tubes and the first imaginary tube defining the interstitial space, with the axis of each interstitial member extending in the same direction as the axes of the fiber optic tubes.

A plurality of elongated cylindrical grounding members surround the plurality of tubes and the plurality of interstitial members. The axes of the grounding members extend in the same direction as the axes of the fiber optic tubes. The plurality of grounding members are arranged whereupon each grounding member is tangent to two other grounding members and the first imaginary tube.

I have also invented an optical fiber cable assembly comprising a plurality of elongated fiber optic conduits received around a longitudinally extending central axis with a longitudinal axis of each fiber optic conduit extending in the same direction as the central axis and with each fiber optic conduit tangent to two other fiber optic conduits. The plurality of fiber optic conduits define a first interstitial space therebetween and define a plurality of second interstitial spaces between each pair of fiber optic conduits on a side thereof opposite the first interstitial space. A plurality of elongated interstitial members are received around the central axis with their longitudinal axes extending in the same direction as the central axis. Each second interstitial space receives one of the interstitial members tangent to the pair of fiber optic conduits defining the second interstitial space.

When viewed from an end of the optic fiber cable assembly, the longitudinal axis of each fiber optic conduit is positioned at one corner of (i) an imaginary triangle or (ii) an imaginary square.

The interstitial members and the fiber optic conduits are also tangent to a first imaginary tube which surrounds the interstitial members and the fiber optic conduits and which has a longitudinal axis coaxial with the central axis.

A central interstitial member can be received in the first interstitial space with an axis of the central interstitial member coaxial with the central axis. When viewed from an end of the optical fiber cable assembly, the first interstitial space is defined by four fiber optic conduits having their axes positioned at corners of the imaginary square.

A plurality of grounding members surrounds the interstitial members and the fiber optic conduits with the longitudinal axes of the grounding members extending in the same direction as the central axis. The plurality of grounding members is arranged with each grounding member tangent to two other grounding members and the first imaginary tube.

DETAILED DESCRIPTION OF THE INVENTION

Figure 1:
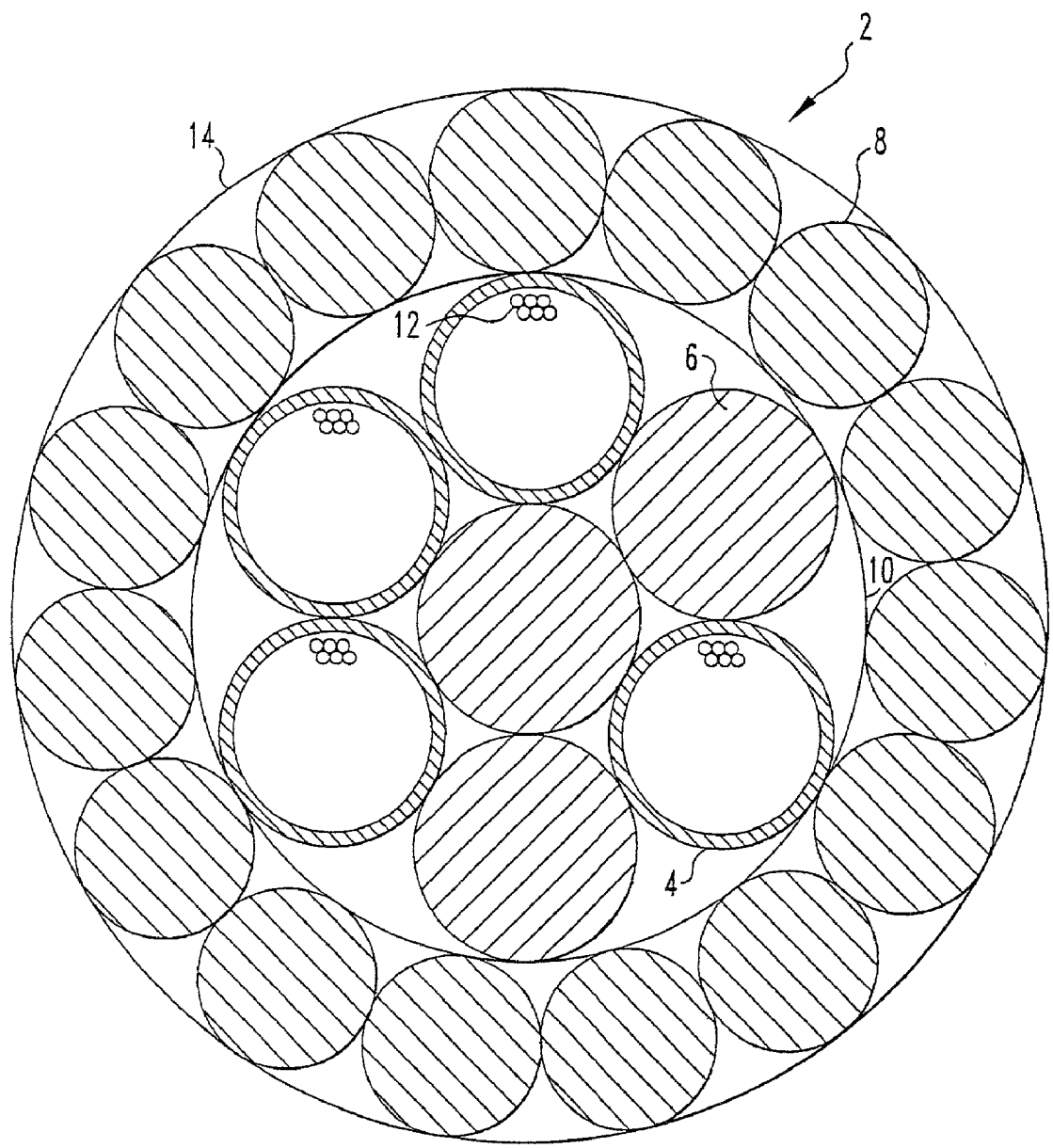
FIG. 1 is an end view of a prior art optical fiber cable assembly.
Figure 2:
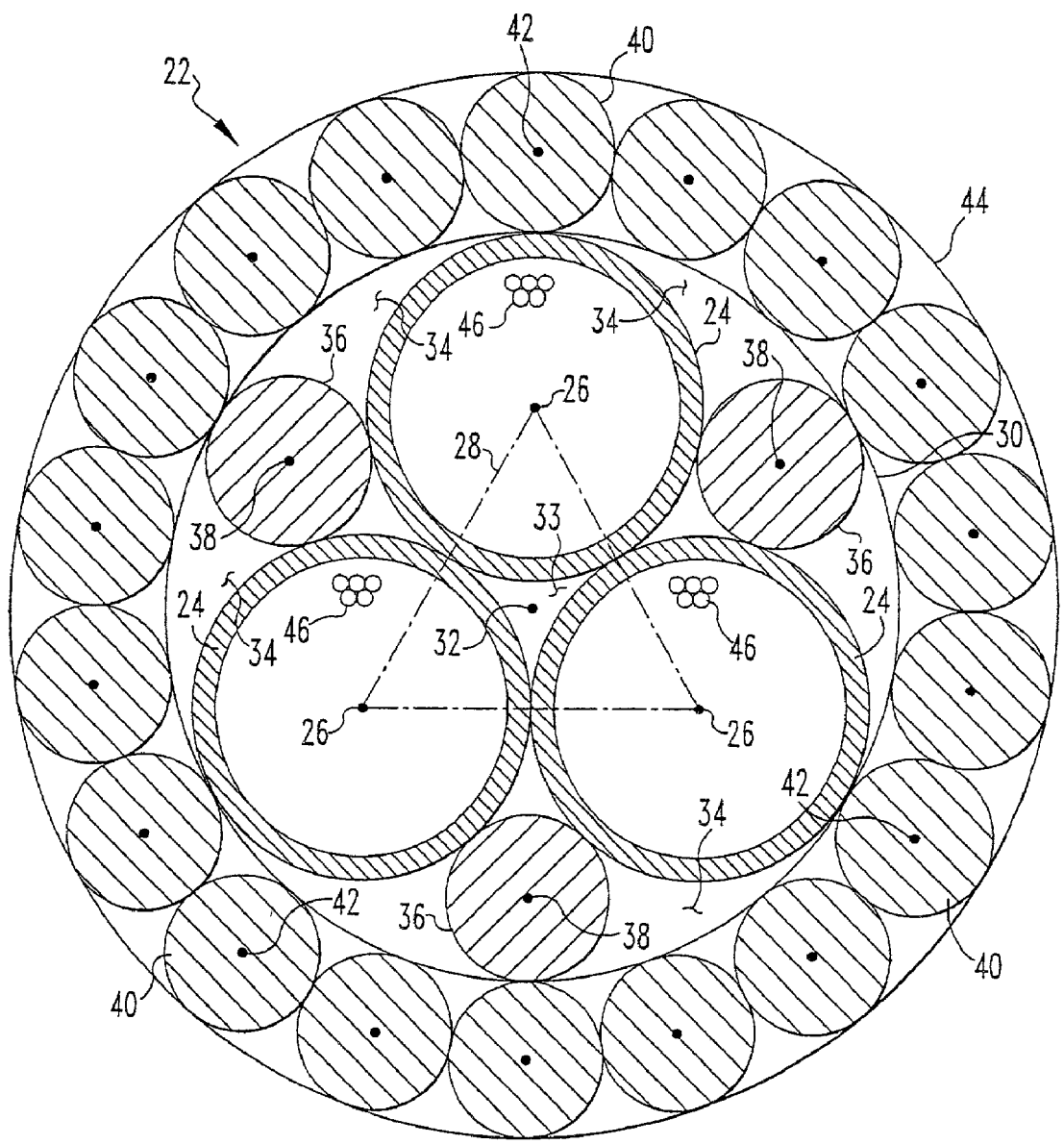
FIG. 2 is an end view of an optical fiber cable assembly in accordance with one embodiment of the present invention.

With reference to FIG. 2, in accordance with one embodiment of the present invention, an optical fiber cable assembly 22 includes a plurality of elongated cylindrical conduits or fiber optic tubes 24 arranged with their longitudinal axes 26 extending in the same direction. In this embodiment, when viewed from an end of optical fiber cable assembly 22, the axis 26 of each fiber optic tube 24 is positioned at one corner of an imaginary triangle 28. Fiber optic tubes 24 are arranged so that each fiber optic tube 24 is tangent to the other two fiber optic tubes 24 and a first imaginary tube 30 which surrounds fiber optic tubes 24. First imaginary tube 30 has a longitudinal axis 32 which is received in a first, central interstitial space 33 defined by fiber optic tubes 24 and which extends in the same direction as the axes 26 of fiber optic tubes 24. Each pair of adjacent fiber optic tubes 24 and first imaginary tube 30 define therebetween a second interstitial space 34.

Optical fiber cable assembly 22 further includes a plurality of elongated cylindrical wires or interstitial members 36. Each interstitial member 36 is received in one of the second interstitial spaces 34 tangent to the two fiber optic tubes 24 and first imaginary tube 30 defining the second interstitial space 34. Interstitial members 36 are positioned in second interstitial spaces 34 with their longitudinal axes 38 extending in the same direction as axes 26 of fiber optic tubes 24.

A plurality of elongated cylindrical grounding members 40 surround fiber optic tubes 24 and interstitial members 36. Grounding members 40 have longitudinal axes 42 which extend in the same direction as axes 26 of fiber optic tubes 24. At each point along the length of fiber optic cable assembly 22, each grounding member 40 is preferably tangent to its two adjacent grounding members 40 and first imaginary tube 30.

Along the length of optical fiber cable assembly 22, fiber optic tubes 24 and interstitial members 36 are wound spirally in a first direction around axis 32 and grounding members 40 are wound spirally in a second direction, opposite the first direction, around axis 32. As a result of these different spiral winding directions, each grounding member 40 is tangent to each fiber optic tube 24 and each second interstitial member 36 at various spaced points along the length of optical fiber cable assembly 22.

Fiber optic tubes 24 and interstitial members 36 are wound spirally with the same winding pitch, typically between ten and sixteen times the diameter of first imaginary tube 30. However, if required by the application, fiber optic tubes 24 and interstitial members 36 can have a lesser winding pitch, as low as 9.5 times the diameter of first imaginary tube 30. Grounding members 40 are wound spirally at a winding pitch typically between ten and sixteen times the diameter of a second imaginary tube 44 which is coaxial with first imaginary tube 30 and which surrounds and is tangent to grounding members 40.

In an exemplary embodiment of optical fiber cable assembly 22, each fiber optic tube 24 has an inside diameter of 3.4 millimeters, an outside diameter of 3.8 millimeters and is preferably formed from stainless steel. The inside diameter of 3.4 millimeters enables each fiber optic tube 24 to receive up to seventy-two optical fibers 46. Each interstitial member 36 has an outside diameter of 1.83 millimeters and is preferably formed from an aluminum alloy, such as aluminum alloy 6201. Each grounding member 40 has an outside diameter of 2.45 millimeters and is preferably formed from an aluminum clad steel. In this exemplary embodiment, second imaginary tube 44 has an outside diameter of 13.09 millimeters and first imaginary tube 30 has an outside diameter of 8.19 millimeters.

Preferably, each interstitial member 36 and each grounding member 40 is formed from a solid wire. However, this is not to be construed as limiting the invention since each interstitial member 36 and/or each grounding member 40 can also be formed from stranded wires or filaments.

Preferably and in practice, fiber optic tubes 24 and interstitial members 36 have a 100% wire fit. That is, each fiber optic tube 24 is tangent to the two other fiber optic tubes 24 and the adjacent interstitial member 36. In addition, grounding members 40 preferably have a 100% wire fit. However, in practice, grounding members 40 have a wire fit that is typically no less than 98.5%. Thus, one or more small gaps may exist between one or more adjacent grounding members 40. In practice, however, most grounding members 40 are tangent to their adjacent grounding members 40.

It is to be appreciated that the exemplary embodiment shown in FIG. 2 is provided to illustrate a single example of optical fiber cable assembly 22. However, this exemplary embodiment is not to be construed as limiting the present invention since the outside diameters of tubes 24, interstitial members 36 and grounding members 40 can be sized as desired.

Figure 3:
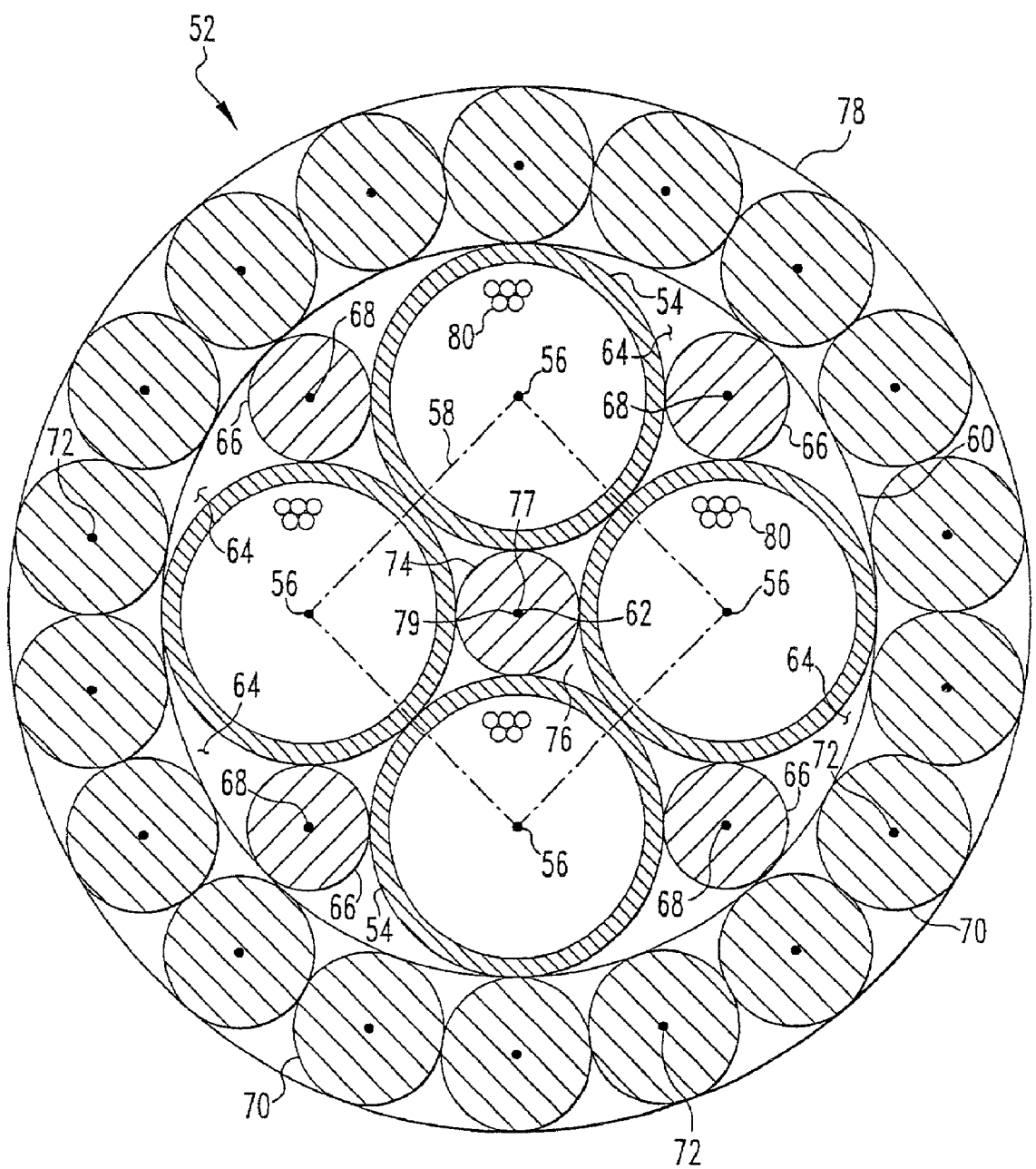
FIG. 3 is an end view of an optical fiber cable assembly in accordance with another embodiment of the present invention.

With reference to FIG. 3, in accordance with another embodiment of the present invention, an optical fiber cable assembly 52 includes a plurality of elongated cylindrical conduits or fiber optic tubes 54 arranged with their longitudinal axes 56 extending in the same direction. In this embodiment, when viewed from an end of optical fiber cable assembly 52, the axis 56 of each fiber optic tube 54 is positioned at one corner of an imaginary diamond or square 58. Fiber optic tubes 54 are arranged so that each fiber optic tube 54 is tangent to its two adjacent fiber optic tubes 54 and a first imaginary tube 60 which surrounds fiber optic tubes 54. First imaginary tube 60 has a longitudinal axis 62 which is received in a first, central interstitial space 76 formed between fiber optic tubes 54 and which extends in the same direction as axes 56 of fiber optic tubes 54. Each pair of adjacent fiber optic tubes 54 and first imaginary tube 60 define therebetween a second interstitial space 64.

Optical fiber cable assembly 52 further includes a plurality of elongated cylindrical interstitial members 66. Each interstitial member 66 is received in one of the second interstitial spaces 64 tangent to the two fiber optic tubes 54 and the portion of first imaginary tube 60 defining the interstitial space 64. Each interstitial member 66 includes a longitudinal axis 68 which extends in the same direction as axes 56 of fiber optic tubes 54.

A plurality of elongated cylindrical grounding members 70 surround fiber optic tubes 54 and interstitial members 66. Grounding members 70 have longitudinal axes 72 which extend in the same direction as axes 56 of fiber optic tubes 54. At each point along a length of optical fiber cable assembly 52, each grounding member 70 is preferably tangent to its two adjacent grounding members 70 and first imaginary tube 60.

Optical fiber cable assembly 52 further includes a central elongated cylindrical interstitial member 74 which is received in central interstitial space 76 tangent to fiber optic tubes 54. Central interstitial member 74 includes a central axis 77 which is coaxial with axis 62 of first imaginary tube 60.

Along the length of optical fiber cable assembly 52, fiber optic tubes 54 and interstitial members 66 are wound spirally in a first direction around axis 62 and grounding members 70 are wound spirally in a second direction, opposite the first direction, around axis 62. As a result of these different spiral winding directions, each grounding member 70 is tangent to each fiber optic tube 54 and each second interstitial member 66 at various spaced points along the length of optical fiber cable assembly 52.

Fiber optic tubes 54 and interstitial members 66 are wound spirally with the same winding pitch typically between ten and sixteen times the diameter of first imaginary tube 60. However, if required by the application, fiber optic tubes 54 and interstitial members 66 can have a lesser winding pitch, as low as 9.5 times the diameter of first imaginary tube 60. Grounding members 70 are wound spirally at a winding pitch typically between ten and sixteen times the diameter of a second imaginary tube 78 which is coaxial with first imaginary tube 60 and which surrounds and is tangent to grounding members 70.

In an exemplary embodiment of optical fiber cable assembly 52, fiber optic tubes 54, interstitial members 66 and grounding members 70 are formed from the same materials used to form fiber optic tubes 24, interstitial members 36 and grounding members 40 of optical fiber cable assembly 22 discussed above in connection with FIG. 2. In this exemplary embodiment, each fiber optic tube 54 has an inside diameter of 3.4 millimeters and an outside diameter of 3.8 millimeters. The inside diameter of 3.4 millimeters enables each fiber optic tube 54 to receive up to seventy-two optical fibers 80. Each interstitial member 66 and central interstitial member 74 has an outside diameter of 1.57 millimeters and each grounding member 70 has an outside diameter of 2.5 millimeters. In this exemplary embodiment, second imaginary tube 78 has an outside diameter of 14.17 millimeters and first imaginary tube 60 has an outside diameter of 9.17 millimeters.

Preferably, each interstitial member 66 and each grounding member 70 is formed from a solid wire. However, this is not to be construed as limiting the invention since each interstitial member 66 and each grounding member 70 can be formed from stranded wires or filaments.

Preferably and in practice, fiber optic tubes 54 and interstitial members 66 have a 100% wire fit. In addition, grounding members 70 preferably have a 100% wire fit. However, in practice, grounding members 70 have a wire fit that is typically no less than 98.5%. Thus, one or more small gaps may exist between one or more adjacent grounding members 70. In practice, however, most grounding members 70 are tangent to their adjacent grounding members 70.

It is to be appreciated that the exemplary embodiment shown in FIG. 3 is provided to illustrate a single example of optical fiber cable assembly 52. However, this exemplary embodiment is not to be construed as limiting the present invention since the outside diameters of tubes 54, interstitial members 66 and grounding wires 70 can be sized as desired.

The optical fiber cable assembly 22 or 52 in accordance with the present invention has a diameter that is 15 to 21% smaller than prior art fiber optic cable assemblies capable of carrying the same number of optical fibers. This reduced diameter decreases the susceptibility of the optical fiber cable assembly to weather related mechanical loads. In addition, the use of smaller diameter interstitial wires and grounding members reduces the overall linear weight of the fiber optic cable assembly over prior art optical fiber cable assemblies capable of carrying the same number of optical fibers. This reduced weight decreases the self loading of the optical fiber cable assembly and reduces the load on overhead structures at the points of attachment of the optic fiber cable assembly thereto.

The invention has been described with reference to the preferred embodiments. Obvious modifications and alterations will occur to others upon reading and understanding the preceding detailed description. For example, in the preceding detailed description, the word "tangent" is utilized to describe a touching relationship between elements. However, due to minor manufacturing variations, some elements may have small gaps therebetween. Accordingly, in the preceding description, the word "tangent" is also intended to be construed as including a relationship where elements may be tangent at most points along the length of the optical fiber cable assembly, but may not be touching at a few points along the length of the optical fiber cable assembly due to these minor variations. It is intended that the invention be construed as including all such modifications and alterations insofar as they come within the scope of the appended claims and the equivalents thereof.

The invention claimed is:

1. An optical fiber cable assembly comprising:
    a plurality of elongated cylindrical fiber optic tubes arranged with their axes extending in the same direction, the axis of each fiber optic tube positioned at a corner of one of (i) an imaginary triangle and (ii) an imaginary square, the plurality of fiber optic tubes arranged with each fiber optic tube tangent to two other fiber optic tubes and a first imaginary tube which surrounds the fiber optic tubes and which has an imaginary axis which extends in the same direction as the axes of the fiber optic tubes, with each pair of adjacent fiber optic tubes and the first imaginary tube defining therebetween an interstitial space; and
    a plurality of elongated cylindrical interstitial members, each interstitial member received in one of the interstitial spaces tangent to the two fiber optic tubes and the first imaginary tube defining the interstitial space, with the axis of the interstitial member extending in the same direction as the axes of the fiber optic tubes, said tubes and interstitial members wound spirally at a winding pitch between 9.5 and 16 times the diameter of the first imaginary tube; and
    the grounding members wound spirally at a winding pitch between 10 and 16 times the diameter of a second imaginary tube which is coaxial with the first imaginary tube and which surrounds the grounding members and is tangent to the grounding members.

2. The optical fiber cable assembly as set forth in claim 1, further including a plurality of elongated cylindrical grounding members surrounding the plurality of tubes and the plurality of interstitial members, the axes of the grounding members extending in the same direction as the axes of the fiber optic tubes, the plurality of grounding members arranged whereupon each grounding member is tangent to two other grounding members and the first imaginary tube.

3. The optical fiber cable assembly as set forth in claim 2, wherein:
    the tubes and the interstitial members are wound spirally in a first direction around the imaginary axis;
    the grounding members are wound spirally in a second direction, opposite the first direction, around the imaginary axis; and
    at various spaced points along the length of the optical fiber cable, each grounding member is tangent to each fiber optic tube and each interstitial member.

4. The optical fiber cable assembly as set forth in claim 1, further including a central elongated cylindrical interstitial member received in a central interstitial space formed between the plurality of fiber optic tubes when they are arranged with their axes positioned at the corners of the imaginary square, the central interstitial member positioned tangent to the plurality of fiber optic tubes with an axis of the central interstitial member extending in the same direction as the axes of the fiber optic tubes.

5. The optical fiber cable assembly as set forth in claim 1, wherein each fiber optic tube is configured to receive a plurality of optical fibers.

6. The optical fiber cable assembly as set forth in claim 1 wherein said fiber optic tubes are formed from stainless steel.

7. The optical fiber cable assembly as set forth in claim 1 wherein said interstitial members are formed from an aluminum alloy.

8. An optical fiber cable assembly comprising:
    a plurality of elongated fiber optic conduits received around a longitudinally extending central axis with a longitudinal axis of each fiber optic conduit extending in the same direction as the central axis and with each fiber optic conduit tangent to two other fiber optic conduits, the plurality of fiber optic conduits defining a first interstitial space therebetween and defining a plurality of second interstitial spaces between each pair of fiber optic conduits on a side thereof opposite the first interstitial space; and
    a plurality of elongated interstitial members received around the central axis with their longitudinal axes extending in the same direction as the central axis, each second interstitial space receiving one of the second interstitial spaces tangent to the pair of fiber optic conduits defining the second interstitial space;
    and a plurality of grounding members surrounding the interstitial members and the fiber optic conduits with the longitudinal axes of the grounding members extending in the same direction as the central axis, the plurality of grounding members arranged with each grounding member tangent to two other grounding members and to a first imaginary tube which surrounds the interstitial members and the fiber optic conduits and which has a longitudinal axis coaxial with the central axis, said fiber optic conduits and the interstitial members wound spirally in a first direction around the central axis, the rounding members wound spirally in a second direction, opposite the first direction, around the central axis and at various spaced points along the length of the optical fiber cable, each grounding member tangent to each fiber optic tube and each interstitial member.

9. The optical fiber cable assembly as set forth in claim 8, wherein, when viewed from an end of the optical fiber cable assembly, the longitudinal axis of each fiber optic conduit is positioned at one corner of one of (i) an imaginary triangle and (ii) an imaginary square.

10. The optical fiber cable assembly as set forth in claim 9, wherein the imaginary triangle is an equilateral triangle.

11. The optical fiber cable assembly as set forth in claim 8, wherein the interstitial members and the fiber optic conduits are also tangent to a first imaginary tube which surrounds the interstitial members and the fiber optic conduits and which has a longitudinal axis coaxial with the central axis.

12. The optical fiber cable assembly as set forth in claim 8, further including a central interstitial member received in the first interstitial space with an axis of the central interstitial member coaxial with the central axis.

13. The optical fiber cable assembly as set forth in claim 12, wherein, when viewed from an end of the optical fiber cable assembly, the first interstitial space is defined by four fiber optic conduits having their axes positioned at corners of an imaginary square.

14. The optical fiber cable assembly as set forth in claim 8, wherein:

the fiber optic conduits and the interstitial members are wound spirally at a winding pitch between 9.5 and 16 times a diameter of the first imaginary tube; and be grounding members are wound spirally at a winding pitch between 10 and 16 times a diameter of a second imaginary tube which surrounds the grounding members and is tangent to the grounding members and which has a longitudinal axis coaxial with the center axis.

15. The optical fiber cable assembly as set forth in claim 8 wherein said fiber optic conduits are formed from stainless steel.

16. The optical fiber cable assembly as set forth in claim 8 wherein said interstitial members are formed from an aluminum alloy.

* * * * *